March 2, 1943. G. MEYER 2,312,433
DEVICE FOR OPERATING CHANGE SPEED GEARS IN MOTOR VEHICLES
Filed Feb. 12, 1941
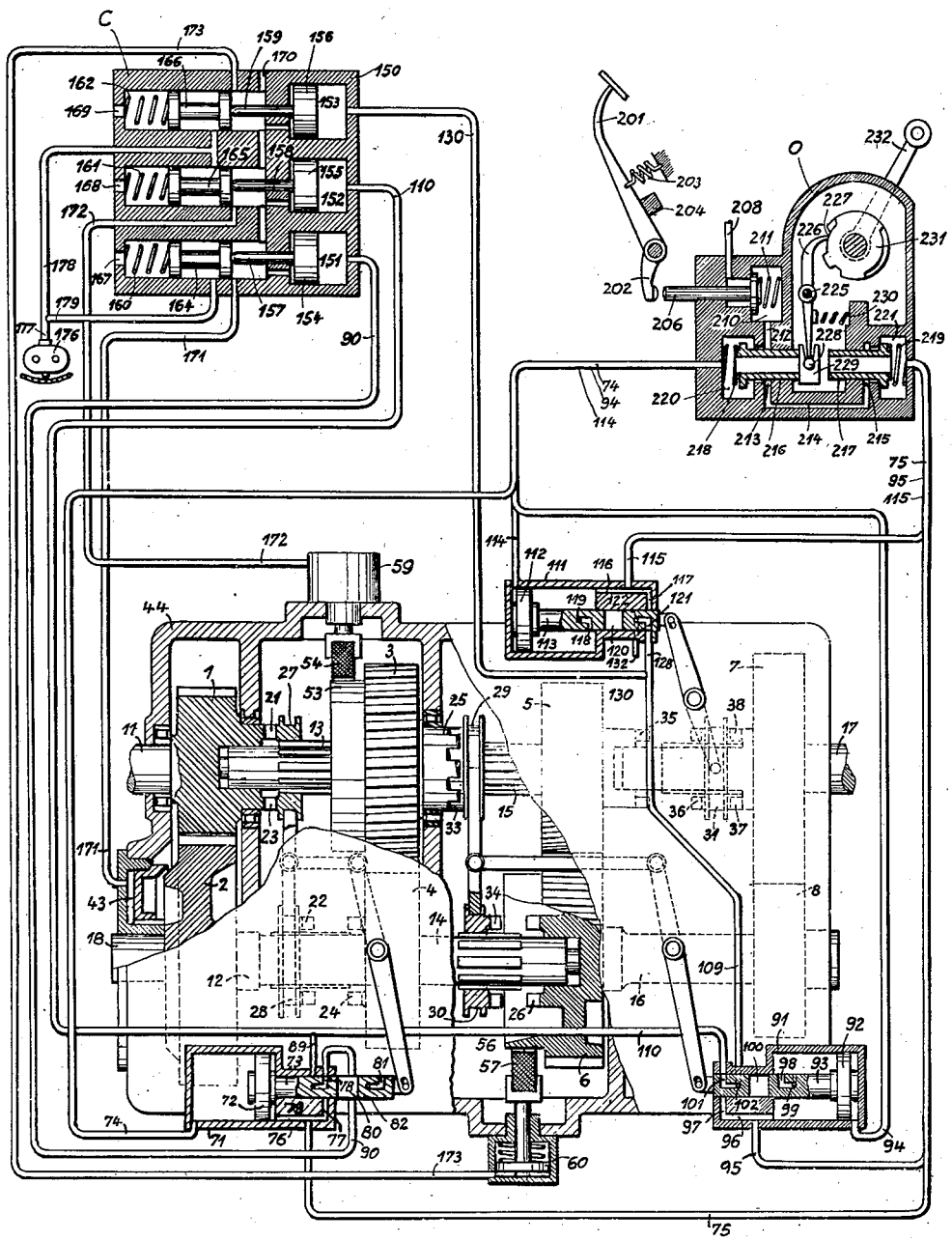
Inventor:
Gustav Meyer
By Edmund H. Parry Jr.
Attorney Patented Mar. 2, 1943

2,312,433

UNITED STATES PATENT OFFICE 2,312,433

DEVICE FOR OPERATING CHANGE SPEED GEARS IN MOTOR VEHICLES

Gustav Meyer, Friedrichshafen-on-the-Bodensee, Germany; vested in the Alien Property Custodian Application February 12, 1941, Serial No. 378,658
In Germany February 15, 1940, 9 Claims. (Cl. 74—339)

My invention relates to devices for operating change speed gears especially in motor vehicles.

With change speed gears having a greater number of speed changes, especially more than four of them, it has become the custom of subdividing the main and also the lay shaft train because then it is possible to have a minimium of gear pairs for a certain number of speed changes, for example only four gear pairs for eight speed changes. Mostly such change speed gears are provided with overrunning couplings, preferably of the double-acting type. When changing speeds in these change speed gears it may happen that a plurality of couplings (two or three for example) is out of engagement at a time while a plurality of others has to be brought into engagement.

Generally it is desired to reduce the time necessary for the speed changes to a minimum, especially when the speed gear is used on vehicles. This may even be necessary according to the type of vehicle concerned, as for example with passenger cars, busses, railway cars and the like. For the purpose of reducing the time for performing the speed changes it is usual to provide auxiliary devices serving to reduce the speed of rotation of one kind of coupling halves and to increase the speed of rotation of another kind until equal speed of rotation or over-running of the coupling halves adapted to come into engagement is attained. It is advisable first to get to engagement the couplings comprising halves which have to be reduced in speed of rotation by braking after the corresponding other couplings belonging to the respective gear pair have previously been disengaged. Thereafter the couplings comprising halves which have to be increased in speed of rotation are brought to engagement after the corresponding other couplings belonging to the respective gear pair have previously been disengaged.

With the known auxiliary devices for reducing the speed of rotation of coupling halves it is usual to provide a braking device at the incoming end of the gear which makes it possible to exert a braking effect on all of the coupling halves concerned in the change speed gear. It is then necessary to disengage the coupling halves to be reduced in speed one after the other and to cause their braking. This has proved to answer the purpose with most of such speed gears. But it has a great disadvantage with gears affording a plurality of disengagements and re-engagements for one speed change, as it is not allowable to disconnect all of the couplings concerned at once, so that the time necessary for performing such a speed change lasts about three or four times as long as a single speed change, for instance 1.5 to 2 seconds instead of a half a second. Such a long time for a speed change is not allowable especially with fast and heavy vehicles.

I avoid these drawbacks according to my invention by providing a plurality of braking devices, one for each of the elements to be reduced in speed of rotation, which after disengagement of the respective coupling or shifting of the shifting gear concerned cause the speed reduction necessary for the intended other engagement. Thus several coupling halves may undergo the braking at the same time so that the time necessary therefore is reduced to a fraction of the former time. And still the individual braking devices may be constructed much smaller and lighter than one common braking device.

The braking devices themselves can be of any desired construction; it appears advisable to operate them by an auxiliary force. It is also of no importance whether they are located at the gear wheels, at the coupling halves or at the respective shaft portions. For the purpose of getting a high braking effect it is preferred to provide them at the larger gear wheel of a pair of wheels, respectively. It is advisable to make their operation depending on the movement of the respective coupling half or shifted gear wheel, or on the movement of the piston for shifting these elements, if such piston is provided, as for example when fluid pressure is used as auxiliary force.

According to my invention it may be advantageous to provide pressure oil for operating the braking devices but to use vacuum as means for governing the oil pressure. Thus the safest operation and smallest device can be attained.

I prefer to provide means for preventing brakes situated nearer to the motor side to get out of operation as long as a brake situated in greater distance from the motor side is operative, so that it is of no consequence which of the different braking devices first causes engagement of the coupling belonging thereto. Thus, in all cases in which not only the first braking device is operated alone, at least two braking devices will be in operation at the same time.

Having given a general description of my invention I now want to point it out more in detail having reference to the drawing which represents an example embodying my invention.

The figure is a diagrammatic showing of a change speed gear with four pairs of gears and the operating device thereto partly in side view and partly in section.

There are four pairs of gears, 1/2, 3/4, 5/6 and 7/8. The incoming shaft 11, the shaft portions 13, 15 and the out-going shaft 17, together with gears 1, 3, 5 and 7 form the main shaft train, whereas shaft portions 18, 12, 14 and 16, together with gears 2, 4, 6 and 8 constitute the lay shaft train. The couplings adapted for engagement and disengagement for the purpose of causing speed changes are coupling 21/23 for connecting and disconnecting gear 1 to and from shaft portion 13, and coupling 25/33 between gear 3 and shaft portion 15, in the main shaft train, and coupling 22/24 between shaft portion 12 and gear 4 and coupling 26/34 between shaft portion 14 and gear 6, in the lay shaft train. The coupling halves 23, 22, 33 and 34 form parts of shiftable sleeves 27, 28, 29 and 30, respectively, which again are splined to the shaft portions 13, 12, 15 and 14, respectively. Sleeves 27 and 28 are so interconnected by adequate lever arrangement that the coupling halves connected thereto operate alternately, which means that when one of them is engaged the other is disengaged and vice versa. A similar lever arrangement is provided for connection between sleeves 29 and 30. Of course, both arrangements are so constructed that engagement of one of the interconnected couplings cannot be performed before the coupling connected thereto has previously been disengaged.

A third alternately operated coupling pair 35/36 and 37/38 is provided on shaft 17 for alternately coupling this shaft with gear 5 or with gear 7 by adequately shifting sleeve 31 on which the coupling halves 36 and 37 are situated.

There is a hydraulic braking device 43 fixed to the casing 44 by means of which lay shaft portions 18 and 12 together with gear pair 2/1 can be reduced in their speed of rotation.

Another hydraulic braking device 59 is fixed to the casing 44 at a place where it is adapted to act on gear 3 by means of friction elements 54 and 53 so as to be able to reduce the speed of rotation of gear pair 3 and 4.

A third brake 60 of similar construction is fixed to casing 44 opposite to gear 6 so as to be able to reduce in speed gear pair 6/5 by causing friction between elements 57 and 56.

The aforementioned three braking devices 43, 59 and 60 are operated by means of oil pressure conducted in conduits 171, 172 and 173, originating from a control device C.

The change speed gear represented allows for 8 different speeds to the set. The transmitting elements in the different speeds are the following:

*1st speed.*—Shaft 11, gear 1, gear 2, coupling 22/24, gear 4, gear 3, coupling 33/25, gear 5, gear 6, shaft portion 16, gear 8, gear 7, coupling 37/38, shaft 17;

*2nd speed.*—Shaft 11, gear 1, gear 2, coupling 22/24, shaft portion 14, coupling 34/26, shaft portion 16, gear 8, gear 7, coupling 37/38, shaft 17;

*3rd speed.*—Shaft 11, coupling 21/23, shaft portion 13, coupling 33/25, shaft portion 15, gear 5, gear 6, shaft portion 16, gear 8, gear 7, coupling 37/38, shaft 17;

*4th speed.*—Shaft 11, coupling 21/23, shaft portion 13, gear 3, gear 4, shaft portion 14, coupling 34/26, shaft portion 16, gear 8, gear 7, coupling 37/38, shaft 17;

*5th speed.*—Shaft 11, gear 1, gear 2, shaft portion 12, coupling 22/24, gear 4, gear 3, coupling 33/25, shaft portion 15, coupling 35/36, shaft 17;

*6th speed.*—Shaft 11, gear 1, gear 2, shaft portion 12, coupling 22/24, shaft portion 14, coupling 34/26, gear 6, gear 5, coupling 35/36, shaft 17;

*7th speed (direct speed).*—Shaft 11, coupling 21/23, shaft portion 13, coupling 33/25, shaft portion 15, coupling 35/36, shaft 17;

*8th speed (over speed).*—Shaft 11, coupling 21/23, shaft portion 13, gear 3, gear 4, shaft portion 14, coupling 34/26, gear 6, gear 5, coupling 35/36, shaft 17.

From the ratio of the diameters of the gears it is to be taken that when intending engagement of the couplings 21/23, 34/26 and 35/36, respectively, it is desirable to reduce in speed of rotation, that is to brake the coupling halves 21, 34 and 35, respectively, for the purpose of causing a reduction in the time necessary for the speed change. Of course, it may be advantageous to have the front faces of the claws of the couplings inclined, as represented in the drawing, but this is not necessary.

For operating the three coupling pairs there are provided three hydraulic or pneumatic devices 71, 91 and 111. These comprise cylinders with pistons to be moved up and down or to and fro, without an intermediate position. Device 71 operates the coupling pairs 21/23 and 22/24, device 91 pairs 25/33 and 34/26, and device 111 pairs 35/36 and 37/38. These cylinders 71, 91 and 111 include pistons 72, 92 and 112, respectively, and piston rods 73, 93 and 113, respectively. The respective fluid pressure conduits are 74 and 75, 94 and 95 and 114 and 115. There are fluid pressure channels inside of the devices 71, 91 and 111 which are designated by the numerals 76 and 77, 96 and 97 and 116 and 117, respectively. The piston rods 73, 93 and 113 are also provided with channels, these are channels 78, 79, 81 and 82 in rod 73, channels 98, 99, 101 and 102 in rod 93, and channels 118, 119, 121 and 122 in rod 113. Besides, these rods each have a slit 80, 100 and 120, respectively. The conduits leading from the cylinders to the control device C are designated by the numerals 89 and 90, 109 and 110 and 128 and 130, respectively. Conduit 132 connects to the open air.

Conduits 90, 110 and 130 in the casing 150 of control device C open into cylinder spaces 151, 152 and 153, respectively, in which pistons 154, 155 and 156 are adapted to move to and fro and press on slide valves 164, 165 and 166, respectively, by means of pins 157, 158 and 159, respectively, against the action of springs 160, 161 and 162, respectively. Apertures 167, 168, 169 and 170 open into the open air.

There is an oil pressure pump indicated at 176 adapted to pump pressure oil into conduits 177, 178 and 179 which is then controlled by slide valves 164 to 166 and afterwards flows through conduits 171, 172 and 173, respectively, to the braking devices 43, 59 and 60, as explained above.

The main operating and control device O comprises a foot lever 201 having an arm 202 adapted to act on pin 206 against the tension of spring 203 tending to hold lever 201 against stop 204. Pin 206 at its other end is shaped into a valve which is held closed by means of spring 211. When pushed open this valve allows vacuum coming from conduit 208 leading for example to the intake of the motor (not represented) to enter into space 210 and from there through channel 212 into space 213 which again is connected to space 215 by means of channel 214. Control valves 216 and 217 are held closed against their respective seats by springs 218 and 219, respectively. When these valves are opened they allow the vacuum to enter into spaces 220 and 221, respectively, to which conduit 74 and conduit 75, respectively, are connected, so that vacuum may act on one or the other side of piston 72 tending to shift sleeves 27 and 28. There are control valves, not represented but similar to valves 216 and 217, and situated there behind, controlling in similar manner the entrance of vacuum into conduits 94 and 95 for action on piston 92 shifting sleeves 29 and 30. And a third arrangement of the same kind, also not represented, serves for controlling the entrance of vacuum into conduits 114 and 115 adapted to operate piston 112 for shifting sleeve 30.

In the main operating device O there are several levers loosely journaled on shaft 225 adapted to cause operation of the different control valves, such as 216 and 217 on which lever 226 is adapted to act. Only this one lever is represented in the drawing; the arrangement of the other levers is similar thereto. A spring 230 tends to press the lower arm of lever 226 to the left so that the abutment 227 of the upper arm is pressed against cam disc 231 adapted to be rotated by means of operating lever 232. The lower end of the lower arm of lever 226 is shaped into a ball 228 or the like which fits into a corresponding opening in the shoe-like element 229 adapted to be moved to and fro by means of lever 226.

For explaining the operation of the entire arrangement it is for example assumed that it is intended to change from the third speed into the sixth speed:

In the third speed the claws of the couplings 21/23, 33/25 and 37/38 are engaged, gears 5 and 6 and gears 8 and 7 are taking part in the power and speed transmission, as this is represented in the figure. Pistons 72 and 92 are in their right end posititions, and piston 112 is in its left hand end position. In the sixth speed the couplings 22/24, 34/26 and 35/36 have to be engaged so that gears 1 and 2 and gears 6 and 5 form part of the transmission, which means that pistons 72 and 92 have to be in their left hand end positions and piston 112 has to be in its right hand end position.

For preparing this change the driver has to rotate the cam discs, as for instance disc 231, from the positions marked for third speed to the positions marked for sixth speed. This setting of the cam discs causes adequate operation of the control valves, so for example valve 216 is opened whereas valve 217 remains closed.

After thus preparing the speed change the driver now pushes foot lever 201 down. (It is advisable to provide coacting means for simultaneously disconnecting the main clutch between the motor and the change speed gear; but as such means are well known they are not represented in the drawing). Arm 202 of the lever 201 opens valve 205 and allows for the vacuum to pass from conduit 208, over spaces 209 and 210, through channel 212 into space 213 which extends cross-wise in front of all of the left hand control valves arranged in series behind valve 216, and by means of channel 214 also into space 215 likewise extending cross-wise in front of all the right hand control valves behind valve 217.

The vacuum now passes for example through valve 216 into space 220 and therefrom through conduit 74 into cylinder 71 causing piston 72 to move to the left. Consequently coupling 21/23 is disconnected and piston 72 moves so far to the left until the front faces of the claws of coupling 22/24 abut against each other, but the two coupling halves are still running past each other with different speeds of rotation, because coupling half 22 having rotated with gear 2 rotates slower than coupling half 24 which is connected to the faster running gear 4.

In similar manner the control valves behind valves 216 and 217 allow vacuum to pass through conduits 95 and 115, respectively, and to enter cylinders 91 and 111, respectively. Piston 92 is moved to the right, coupling 33/25 is disconnected and the front faces of the claws of coupling 34/26 are brought to touch each other. At first coupling half 34 rotates faster than coupling half 26. Piston 112 is moved to the right, which movement causes disconnection of coupling 37/38 and touching of the claws of coupling 36/35, while, at first, coupling half 35 rotates faster than coupling half 36.

The slits 80, 100 and 120, respectively, are not situated exactly in the middle between the channels crossing the piston rods 73, 93 and 113, respectively, but are nearer to the channels 78, 98 and 118, respectively, than to the channels 81, 101 and 121, respectively. The situations of slits 80, 100 and 120, respectively, are so chosen, that these slits cause admission of vacuum to conduits 90, 110 and 128, respectively, in such cases when it is necessary to operate the braking devices 43, 59 and 60, respectively, whereas in the other cases speeding up of the coupling half connected to the motor side is necessary. Thus slit 80 passes over channel 78 and comes to rest further to the left when the front faces of the claws of coupling halves 22 and 24 get to touch. But when the front faces of the claws of coupling halves 34 and 26 touch each other piston 92 and its rod 93 are so situated that slit 100 comes to rest opposite to conduit 110 thereby allowing entrance of vacuum into this conduit and to space 152 of device C. In the same manner slit 120 rests opposite to conduit 128 causing vacuum to enter space 153, as long as coupling halves 35 and 36 are only in touch with the front faces of their claws.

Thus in device C there is no vacuum in space 151, but spaces 152 and 153 are filled with vacuum which causes valves 165 and 166 controlling the pressure oil to operate. This means that these two valves are moved upward so that pressure oil is fed from the oil pump 176 through the conduits 177, 178, the channels 181 and 182, and over the valves 166 and 165 into conduits 173 and 172, respectively. The pressure oil fed through conduit 172 causes operation of braking device 59, and that fed through conduit 173 makes braking device 59 to operate.

The friction elements 54 and 53 are pressed against each other thereby reducing the speed of rotation of gear 3 and also gear 4 which is in mesh with gear 3. The speed of shaft portion 14 is also reduced together with that of coupling half 34. The constant speed reduction of coupling half 34 after a short time causes this half to come to equal or even lower speed of rotation than the other half 26, so that under the pressure of piston 92 these two coupling halves come to engagement and piston 92 gets into its left hand end position. This means that conduits 109 and 110 are connected to each other by means of channels 98 and 99.

But as long as coupling 35/36 is not fully engaged piston 112 is not yet in its right hand end position so that vacuum is allowed to enter conduit 128 through slit 120. As conduit 128 is not only in connection with conduit 130 leading to space 153 but is also in connection with conduit 109 vacuum is at the same time also fed to space 152 over channels 99, 98 and conduit 110. Consequently, braking device 59 is still held in operative position as long as coupling 35/36 is not engaged, even after engagement of coupling 34/26. Thus both braking devices are now operative on coupling half 35 until its speed of rotation equals or becomes slower than that of coupling half 36, so that final engagement of the corresponding claws is effected.

Now piston 112 gets into its right hand end position so that conduit 128 by means of channels 118 and 119 is connected to conduit 132 which opens into the open air. Consequently the spaces 152, 153 are again free from vacuum and valves 165 and 166 return to their lower position, as represented in the drawing, thereby cutting off the oil pressure from the braking devices, which become inoperative again.

The driver will now relieve the pressure on foot lever 201 (thereby allowing for the not represented main clutch to engage again) and valve 205 will close again, so that no vacuum is fed any more. As soon as the driver gives gas again coupling half 22 is speeded up to the speed of coupling half 24 thus causing engagement of this coupling also. Thus the desired change from third to sixth speed is completed.

In the following lines I want to describe the change from first speed to eighth speed in which case all three braking devices become operative:

In the first speed the couplings 22/24, 33/25 and 37/38 are in engagement and pistons 72 and 112 are in their left hand end positions, respectively, whereas piston 92 is in its right hand end position. In the eighth speed couplings 21/23, 34/26 and 35/36 are in engagement, which means that all the pistons have to be shifted to positions opposite to the aforementioned positions.

The driver has again to prepare the change by adequate setting of the cam discs, then he pushes the foot lever 201 (thereby disconnecting the main clutch) and allows vacuum to enter spaces 213 and 215 and from there into conduits 75, 95 and 115. Pistons 72 and 112 are moved to the right and piston 92 is moved to the left. Thus the aforementioned three couplings of the first speed are disconnected and the claws of the other three couplings are brought into touch. In the corresponding positions of the pistons and their rods slits 80, 100 and 120 become operative so that vacuum is fed to conduits 90, 110 and 130. All three pistons, 154, 155 and 156 and their slide valves 164, 165 and 166, respectively, are moved upward, thereby feeding pressure oil to all three braking devices 43, 59 and 60, respectively. The operation of these devices causes a reduction in speed of rotation of coupling halves 21, 34 and 35, until they run with equal or lower speed than the corresponding other halves which speed reduction is attained in shortest time. Upon final engagement of couplings 21/23, 34/26 and 35/36 the pistons have moved to their other end positions, respectively, so that the flow of the vacuum is interrupted again. The vacuum conduits are connected to the open air again by means of conduit 132, and control valves 164, 165 and 166 move back to their lower positions. All three braking devices are released immediately on engagement of the three couplings.

By my invention the time necessary for performing a speed change is reduced to a minimum.

It is of no importance which coupling gets to engagement first, as the braking devices, according to my invention, are so controlled, that as long as one of the braking devices is operative the device or the devices which are closer to the driving engine remain in operation also. This is attained by means of channels 78, 79; 81, 82; 98, 99; 101, 102; 118, 119; 121, 122 and the arrangement of the interconnecting conduits, as explained in detail above in the description of the speed change into the sixth speed.

I do not want to be limited to the details described or shown in the drawing as many variations will occur to those skilled in the art without deviating from the scope of my invention.

What I claim is:

1. In a change speed gear including a plurality of pairs of coacting gears, one gear of each pair being mounted on main shaft portions and the other gear of each pair being mounted on lay shaft portions, couplings between the gear pairs operative to establish driving connection from one gear pair to another gear pair, a plurality of selectively operable braking devices each operative to retard one gear pair, and actuating means for each braking device becoming operative in dependency on disconnection of the coupling establishing driving connection from the gear pair adapted to be retarded by said braking device to another gear pair.

2. In a change speed gear including a plurality of pairs of coacting gears, one gear of each pair being mounted on main shaft portions and the other gear of each pair being mounted on lay shaft portions, couplings between the gear pairs operative to establish driving connection from one gear pair to another gear pair, a plurality of selectively operable braking devices each operative to retard one gear pair, fluid pressure operated actuated means for each braking device and control valve means for each fluid pressure operated actuating means for supplying fluid pressure becoming operative in dependency on disconnection of the coupling establishing driving connection from the gear pair, adapted to be retarded by said braking device actuated by said actuating means to another gear pair.

3. The structure defined in claim 1 further including power operated actuating means for shifting the couplings between the gear pairs.

4. The structure defined in claim 2 further including power operated actuating means for shifting the couplings between the gear pairs.

5. In a change speed gear including a plurality of pairs of coacting gears, one gear of each pair being mounted on main shaft portions and the other gear of each pair being mounted on lay shaft portions, couplings between the gear pairs operative to establish driving connection from one gear pair to another gear pair, a plurality of braking devices each operative to retard one gear pair, and actuating means for operating all of said braking devices becoming operative in dependency on disconnection of the coupling establishing driving connection from one of said gear pairs to another gear pair.

6. In a change speed gear including a plurality of pairs of coacting gears, one gear of each pair being mounted on main shaft portions and the other gear of each pair being mounted on lay shaft portions, couplings between the gear pairs operative to establish driving connection from one gear pair to another gear pair, a plurality of selectively operable braking devices each operative to retard one gear pair, selectively operative actuating means for operating the braking devices, and fluid pressure operated control means for the actuating means.

7. In a change speed gear, an input shaft, a series of pairs of coacting gears, one gear of each pair being mounted on main shaft portions and the other gear of each pair being mounted on lay shaft portions, one of said gear pairs being driven by the input shaft, couplings between the gear pairs for establishing a driving connection from each gear pair to the succeeding gear pair a plurality of selectively operable braking devices for retarding each of at least two gear pairs, and selectively operative actuating means for the braking devices becoming operative in dependency on disengagement of a coupling from one gear pair to a succeeding gear pair to operate the braking device for retarding said one gear pair and the braking devices for the preceding gear pairs between the said one gear pair and the input shaft.

8. The structure defined in claim 7 further including power operated actuating means for shifting the couplings between the gear pairs.

9. The structure defined in claim 7 wherein said actuating means becomes inoperative to continue operation of at least the braking device for said one gear pair in dependency on engagement of a coupling from said one gear pair to the succeeding gear pair.

GUSTAV MEYER.